March 24, 1959
W. STRATTON ET AL
2,878,694
LATHE DRILL ATTACHMENT
Filed Sept. 9, 1957
2 Sheets-Sheet 2
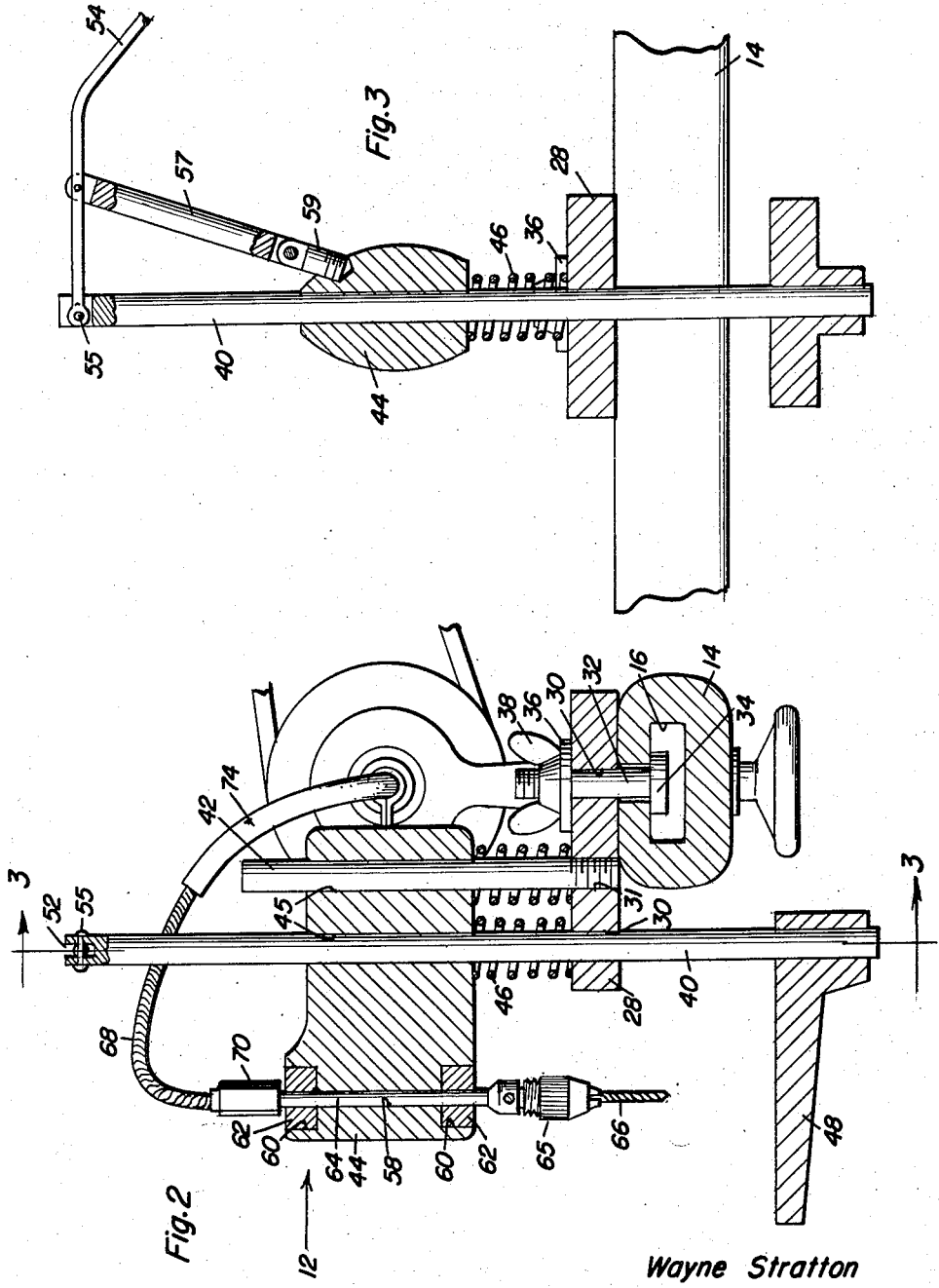
Wayne Stratton
William E. Stokes, Jr.
INVENTORS

United States Patent Office 2,878,694
Patented Mar. 24, 1959

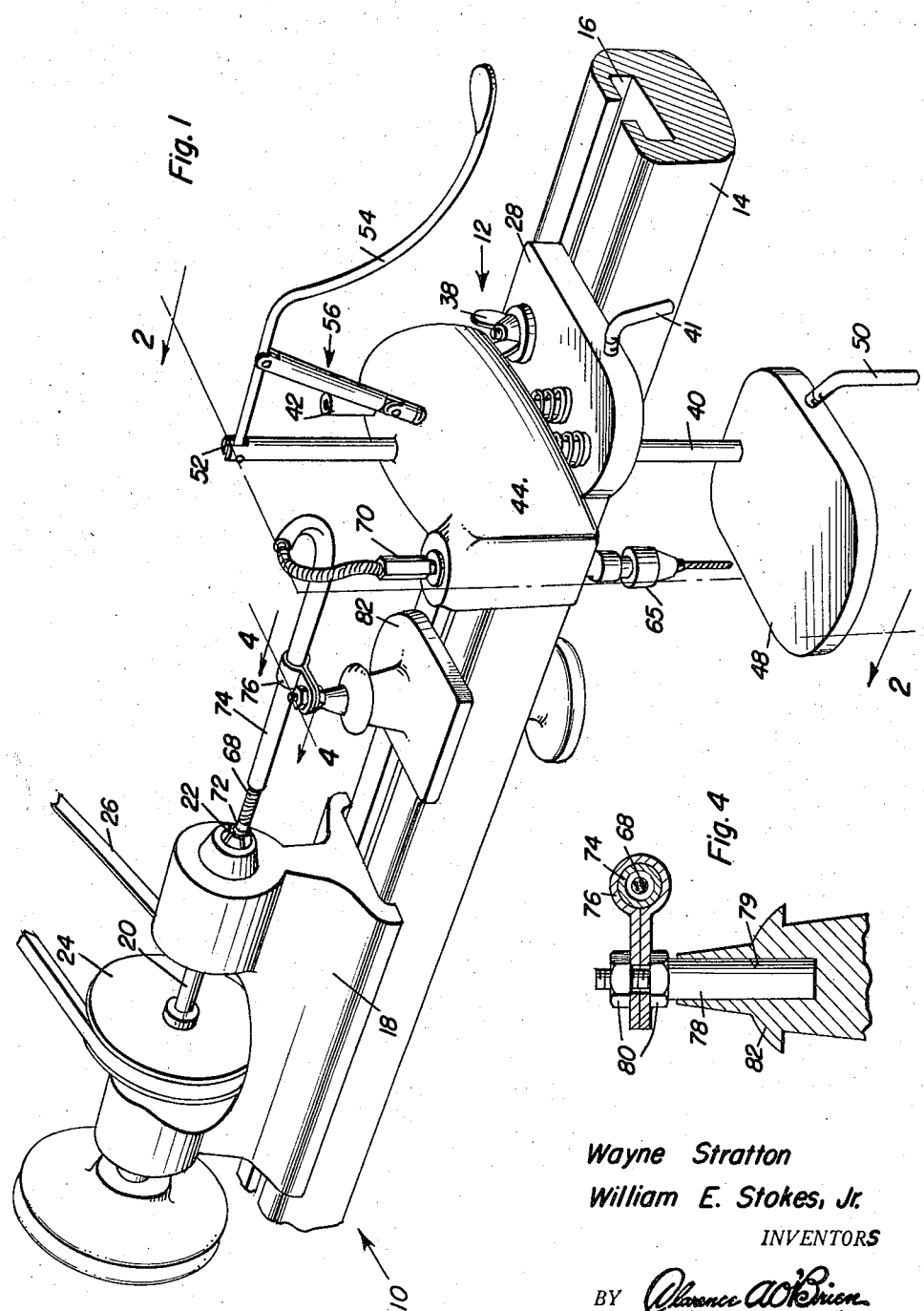
Wayne Stratton
William E. Stokes, Jr.
INVENTORS

2,878,694

LATHE DRILL ATTACHMENT

Wayne Stratton and William E. Stokes, Jr.,
Miles City, Mont.

Application September 9, 1957, Serial No. 682,883

9 Claims. (Cl. 77—5)

This invention relates generally to a lathe drill attachment and more specifically to a flexible shaft driven vertical drill press for attachment to a jeweler's lathe.

An object of the present invention is to provide an attachment for a lathe which may be constructed of a small size and is adaptable to fit any standard watchmaker's lathe.

Another object of the present invention is to provide a drill press attachment for a watchmaker's lathe wherein the drill will be mounted vertically so that the drilling will be done down into the work, instead of sideways into the work as most watchmakers nowadays use their lathes.

A further object of the present invention is to provide a drill press attachment which may derive its power from the lathe drive thereby eliminating the use of any additional power unit.

A still further object is to provide a simple and compact lathe drill attachment which is simple and compact so that it may be stored in a watchmaker's drawer when not in use, and takes but a short while to set up.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view illustrating the drill press attached to a watchmaker's lathe;

Figure 2 is a vertical transverse sectional view taken substantially along the plane of reference line 2—2 of Figure 1 and illustrating various details of the drill press as well as the structure for attaching it to a lathe;

Figure 3 is a vertical longitudinal sectional view taken substantially along the plane of reference line 3—3 of Figure 2 and illustrating details of the handle for lowering the head carrying the drill toward the bed plate of this attachment; and Figure 4 is a vertical transverse sectional view taken substantially along the plane of reference line 4—4 of Figure 1 and illustrating the details of the support for the flexible shaft.

The numeral 10 generally designates a jeweler's lathe of the type well-known in the art. The numeral 12 generally designates the drill press attachment which is the subject of the present invention, and the drill press attachment 12 is shown mounted on a jeweler's lathe 10 in Figure 1.

The usual type of jeweler's lathe includes a lathe bed 14 which has an undercut longitudinal T-shaped slot 16 formed in its upper surface. On the lathe bed 14 is mounted a frame 18 which supports a shaft 20 which is journaled therein. On one end of shaft 20 is connected a chuck 22 as is conventional in lathes. A pulley 24 mounted on the shaft 20 derives its motion from a drive belt 26 connected to a motor (not shown). Thus, the chuck 22 is given a rotating motion.

Regarding now the drill press attachment 12, it may be seen that this consists of a support plate 28 which rests on the lathe bed 14. A plurality of vertical holes 30 are formed in the support plate, and into one of them is fitted a bolt 32. This bolt 32 extends through the plate 28 in depending fashion and a washer 36 and wing nut 38 are secured on the threaded shank portion of bolt 32 and hold it in place. The head 34 of bolt 32 is spaced from the support plate 28. It may now be seen that the support plate and the fastening means for the support plate as described will allow the support plate to be fastened to the bed 14 by inserting the head 34 of the bolt into T-shaped slot 16 and then tightening wing nut 38.

Received in and slidable through the other of the openings 30 on another end of the support plate 28 from the bolt 42, is a vertical shaft 40 which passes through support plate 28 and extends both above and below the support plate. A setscrew 41 is threaded into an opening in the support plate 28 and adjustably engages the vertical shaft 40, in such a manner that the vertical shaft 40 may be variably positioned up or down, or rotated angularly about its longitudinal axis. In a threaded opening 31 in the support plate, is threadingly engaged a guide shaft 42 which extends upwardly from support plate 28. A head 44 having bores 45 passing vertically therethrough, is slidably engaged on vertical shaft 40 and guide shaft 42 in such a manner as to allow the shafts 40 and 42 to pass through bores 45. Coil springs 46 encircle the shafts 40 and 42 and are disposed between the support plate 28 and the head 44. A bed plate 48 is adjustably secured on the lower end of vertical shaft 40, by a setscrew 50 engaging said shaft and threadingly engaged in an opening in said plate 48. It may now be seen that the bed plate 48 is adjustably secured to vertical shaft 40 in such a manner that it may be variably adjusted either up and down on the shaft or rotatably about its longitudinal axis. At the upper end of vertical shaft 40, a slot 52 is formed into which fits the end of a handle 54 secured thereto by a pin 55 or any other suitable means. A connecting arm 56 located between the handle 54 and head 44 serves as a link in transmitting motion from the handle 54 to the head 44 to thereby lower the head on the vertical shaft 40 and on the guide shaft 42. This connecting arm 56 is composed of upper and lower members 57 and 59 respectively, which are pivotally connected. The lower member 59 is threadingly secured in said head in an opening provided adjacent the opening 45 in which the vertical shaft 40 is located. The upper member 57 is pivotally connected to handle 54 in any suitable manner, as by a pin and slot, arm 56 being positioned so as to form an acute angle with vertical shaft 40, whereby the major portion of the connecting arm motion is in a vertical direction.

A vertical bore 58 is formed in one end of the head 44, and opens into large chambers 60 formed at the top and bottom of the head 44. Bushings 62 are pressed into chambers 60, and in these bushings is journaled a rotatable shaft 64 which has a threaded portion, not shown, extending upwardly from the top of head 44, and has a bottom end projecting downwardly from the bottom of head 44 and carrying a conventional chuck 65 thereon. In Figures 1 and 2 a bit 66 is secured in the chuck 65.

A flexible shaft 68 has a socket member 70 secured at one end and a cylindrical member 72 secured at the other. The socket member 70 is formed with a threaded bore therein and this socket is threadingly engaged upon the screw threaded upper extremity of the rotatable shaft 64. The cylindrical member 72 is secured by the chuck 22 and driven therefrom in a well-known manner. A flexible cable guard 74 surrounds the flexible shaft 68 at its medial portion. Loop clamp 76 is secured about cable guard 74 and has two projecting ends having openings therein into which is passed a stud 78. This stud is in the form of a cylindrical bar having a narrower portion at the upper end which has threads thereon. Nuts 80 are threaded onto stud 78 on opposite sides of the loop clamp 76 and thus secure it in position. The stud 78 is swiveled in a socket 79 in a support stand 82 which stand is slidably accommodated in the lathe bed 14 and is secured in place in any suitable manner.

In use, the drill press attachment is secured to lathe 14 by passing the head 34 of bolt 32 into the T-shaped slot in the bed. This is then secured in place by tightening up on wing nut 38 and the cylindrical member 72 is secured into the chuck 22. Now when the chuck is driven in the conventonal manner, motion is imparted to the flexible shaft 68 which transmits this motion through socket member 70 to the rotatable shaft 64 and thence down to the chuck 65 and eventually to the bit 66. It is to be noted that the bed plate 48 may be adjusted in any position axially or rotationally on vertical shaft 40, and the shaft 40 may in turn be selectively positioned with respect to support plate 28. Now, a workpiece may be held on bed plate 48 and with the bit 66 turning, the handle 54 may be pushed down on so as to lower the head 44. The handle transmits its motion to connecting arm 56, and thus moves the head 44 against the action of springs 46 and the bit will be lowered into the work. It can be seen that upon releasing the handle 54, the springs 46 will move the head 44 into its original position.

The present invention provides a drill press attachment especially adapted for use with jeweler's lathes which is simple in construction and use, and wherein the drilling in done vertically instead of horizontally.

The foregoing is considered as illustrative only of the principles of the invention. Further, numerous modifications and changes will readily occur to those skilled in the art, it is not desired to limit the invention to the exact construction and operation shown and described; and accordingly all suitable modifications and equivalents may be resorted to, falling within the scope of the appended claims.

What is claimed as new is as follows:

1. A drill press attachment for a jeweler's lathe of the type including an elongated horizontal bed with a T-slot in its upper surface, a horizontal shaft supported from said bed and connected to a source of power and having a chuck mounted thereon, said attachment comprising; a base mounted upon the top surface of said bed and overhanging one side thereof and secured thereto by fastening means engaging in said T-slot, a head, means on said base mounting said head for guided and sliding vertical movement, a vertical shaft journaled in said head, a drill secured to the lower end of said shaft and extending below said head, a flexible drive shaft connected to the upper end of said vertical shaft and to said chuck, a support platform mounted upon said base and disposed below said head, actuating means connected to said base and to said head for causing vertical movement of the latter.

2. The combination of claim 1 wherein said means mounting said head includes a pair of vertical standards rising from said base, said head having vertical bores therethrough guidingly receiving said standards.

3. The combination of claim 1 wherein said means mounting said head includes a pair of vertical standards rising from said base, said head having vertical bores therethrough guidingly receiving said standards, one of said standards being journaled in said base for vertical sliding movement, means on said base engaging said one standard for securing the latter in vertically adjusted position on said base.

4. The combination of claim 1 wherein said means mounting said head includes a pair of vertical standards rising from said base, said head having vertical bores therethrough guidingly receiving said standards, spring means surrounding each of said standards and abutting said base and head and yieldingly urging said head upwardly upon said standards.

5. The combination of claim 1 wherein said means mounting said head includes a pair of vertical standards rising from said base, said head having vertical bores therethrough guidingly receiving said standards, one of said standards being journaled in said base for vertical sliding movement, means on said base engaging said one standard for securing the latter in vertically adjusted position on said base, said support platform being mounted upon said one standard.

6. The combination of claim 1 including a support bracket mounted upon said bed intermediate said base and said chuck and supporting said flexible drive shaft.

7. The combination of claim 1 wherein said actuating means comprises a lever pivoted at one end to one of said standards, an articulated connecting arm having one end fixedly secured to said head having its other end pivoted to said lever.

8. The combination of claim 1 wherein said means mounting said head includes a pair of vertical standards rising from said base, said head having vertical bores therethrough guidingly receiving said standards, one of said standards being journaled in said base for vertical sliding movement, means on said base engaging said one standard for securing the latter in vertically adjusted position on said base, said actuating means comprising a lever pivoted to the upper end of said one standard and connecting means attaching said lever to said head.

9. The combination of claim 8 wherein said connecting means comprises an articulated member having its upper end pivoted to said lever and having its lower end fixedly secured to said head.

References Cited in the file of this patent

UNITED STATES PATENTS

| | | |
|---|---|---|
| 2,341,061 | Rhodes et al. | Feb. 8, 1944 |
| 2,729,990 | Ballman | Jan. 10, 1956 |
| 2,776,604 | Simsack | Jan. 8, 1957 |

FOREIGN PATENTS

| | | |
|---|---|---|
| 7,895 | Great Britain | Apr. 2, 1906 |